(12) United States Patent
Sequeira et al.

(10) Patent No.: US 9,184,987 B2
(45) Date of Patent: Nov. 10, 2015

(54) SYSTEM AND METHOD FOR AUTOMATIC CONFIGURATION OF MASTER/SLAVE DEVICES ON A NETWORK

(75) Inventors: Melwyn F. Sequeira, Fort Lauderdale, FL (US); Michael del Busto, Lake Worth, FL (US); Stewart E. Hall, Wellington, FL (US); Douglas A. Drew, Boca Raton, FL (US); Jan B. Forney, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 570 days.

(21) Appl. No.: 13/102,617

(22) Filed: May 6, 2011

(65) Prior Publication Data

US 2012/0215874 A1 Aug. 23, 2012

Related U.S. Application Data

(60) Provisional application No. 61/463,819, filed on Feb. 23, 2011.

(51) Int. Cl.
*G06F 15/16* (2006.01)
*H04L 12/24* (2006.01)
*H04L 12/12* (2006.01)
*H04L 29/12* (2006.01)

(52) U.S. Cl.
CPC .......... *H04L 41/0672* (2013.01); *H04L 12/12* (2013.01); *H04L 41/0846* (2013.01); *H04L 41/0886* (2013.01); *H04L 41/0889* (2013.01); *H04L 61/103* (2013.01); *H04L 61/2038* (2013.01); *H04L 61/2015* (2013.01); *Y02B 60/34* (2013.01); *Y02B 60/35* (2013.01)

(58) Field of Classification Search
CPC ............ H04L 41/0846; H04L 41/0672; H04L 41/0886; H04L 41/0889; H04L 61/2038; H04L 61/103; H04L 61/2015; H04L 12/12
See application file for complete search history.

(56) References Cited

U.S. PATENT DOCUMENTS

| | | | |
|---|---|---|---|
| 7,134,595 B2 * | 11/2006 | Clark et al. | 235/382 |
| 2005/0132030 A1 * | 6/2005 | Hopen et al. | 709/223 |
| 2006/0246892 A1 | 11/2006 | Vondoenhoff | |

(Continued)

OTHER PUBLICATIONS

EPO International Search Report dated Nov. 3, 2011 for corresponding appln PCT/US11/00815.

*Primary Examiner* — Thomas Dailey
*Assistant Examiner* — Nam Tran
(74) *Attorney, Agent, or Firm* — Alan M. Weisberg; Christopher & Weisberg, P.A.

(57) ABSTRACT

A people counting system and method for the automatic reconfiguration of a failed people counting sensor device in a people counting system. The system includes a plurality of addressable people counting sensor devices defining a cluster having a master device in communication with at least one slave device, each of the master device and the slave devices having a corresponding Media Access Control ("MAC") address. The master device is adapted to sequentially transmit power-on commands to each of the slave devices, assign a different node address to each of the slave devices, receive an association of the MAC address of the master device to the node address and MAC address of each of the slave devices to form a cluster configuration, store the cluster configuration as a cluster configuration table, and replicate the cluster configuration table to the slave devices. A dynamic host configuration protocol (DHCP) server assigns an IP public address to the master device.

23 Claims, 9 Drawing Sheets

(56) References Cited

U.S. PATENT DOCUMENTS

2007/0115827 A1* 5/2007 Boehnke et al. .............. 370/236
2008/0140813 A1* 6/2008 Ratcliff et al. ................ 709/223
2008/0205418 A1* 8/2008 Rose et al. .................... 370/401
2008/0303692 A1 12/2008 Hirai
2008/0309491 A1* 12/2008 Gillard et al. .............. 340/572.1
2009/0133040 A1* 5/2009 Stevens, IV .................. 719/315

* cited by examiner

SYSTEM AND METHOD FOR AUTOMATIC CONFIGURATION OF MASTER/SLAVE DEVICES ON A NETWORK

CROSS-REFERENCE TO RELATED APPLICATION

This application is related to and claims priority to U.S. Provisional Application Ser. No. 61/463,819, filed Feb. 23, 2011, entitled System and Method for Automatic Configuration of Master/Slave Devices on a Network, the entirety of which is incorporated herein by reference

STATEMENT REGARDING FEDERALLY SPONSORED RESEARCH OR DEVELOPMENT n/a

FIELD OF THE INVENTION

The present invention relates generally to network-based security system devices and more specifically to auto-configuration and addressing of interconnected devices in people counting systems.

BACKGROUND OF THE INVENTION

People counting devices are typically used to count people entering and exiting doorways of stores. Typical doorways are entrances to stores in either open or enclosed malls. One type of people counting system is an overhead people counting system employing image sensors or thermal sensors to identify and count people entering or leaving a store. Information gathered by the sensors is analyzed and can be used by store managers to improve store sales performance and optimize scheduling of resources. The sensors have a limited field of view. In most cases, a single sensor may be used to "see" entrances with lengths of 6' to 8'. Hence, in order to cover entrances wider than 8' typical of mall-based stores, it is common practice to "cluster" two or more sensors to "see" much wider entrances; typically 24' to 32' in length. In other instances, multiple sensing devices can be interconnected to cover large entrances in excess of 32' wide. In either configuration, the people counting system must count people entering and leaving doorways and report this information to a remote host computer through a dedicated communications interface, such as an Ethernet connection.

In a multi-device network, each of these devices is linked to another so as a system they appear to cover or "see" one contiguous wide exit. Typically, one of these devices is a "master" device, sensor or node and is in communication with other "slave" devices, sensors or nodes, where each slave node must "bind" to their master. Any overlap in the "field of view" must be communicated to and resolved by the master.

The master and slave devices must typically be configured to suit their environment. Such configuration includes but may not be limited to: setting up one or more virtual count lines, device IDs, physical and logical locations and their corresponding mapping, and various other set up parameters. Virtual count lines are virtual thresholds in memory used to delineate cross-over thresholds crossing the field of view, e.g., across a store entrance. Typically these parameters are downloaded on-site via a PC and stored within the hardware of the people counting system. In currently deployed systems, if a device fails and must be replaced, one has to install a new device and have it set up and re-configured all over again. This requires a field technician to visit the site, re-initialize the sensor, and download the set-up parameters all over again.

Devices currently installed in the field and more specifically sensors using Ethernet (Internet) connectivity, employ an Internet Protocol ("IP") address that uniquely identifies the device from all other devices on the network. These address blocks are typically purchased, allocated and deployed by service providers to customers for devices that connect to the network. Given the widespread use of devices deployed across the Ethernet, institutions are reluctant to issue their IP addresses to manufacturers of Ethernet-based devices or use their assigned public IP addresses to support in-store security systems. In addition, when one of the devices fails for any reason, the device has to be replaced, requiring its IP address and configuration parameters to be manually downloaded again.

Therefore, what is needed is an efficient and cost effective system and method for automatically configuring devices in a security system, e.g., automatically configuring sensors in a people counting system.

SUMMARY OF THE INVENTION

The present invention advantageously provides a method and system for configuring networked security system devices such as people counter sensors where the sensors are arranged in a master/slave relationship. In accordance with one aspect, the present invention provides a system having a plurality of addressable devices. The plurality of devices define a cluster having a master device in communication with at least one slave device. Each of the master device and the at least one slave device have a corresponding Media Access Control ("MAC") address. The master device is adapted to transmit a power-on command to the at least one slave device, assign a different node address to each of the at least one slave devices, receive an association of the MAC address of the master device to the node address and MAC address of each of the at least one slave devices to form a cluster configuration, store the cluster configuration as a cluster configuration table, and replicate the cluster configuration table to the at least one slave device. In one embodiment, the devices are people counting sensors.

In accordance with another aspect, the present invention provides a method of configuring a plurality of devices. The plurality of devices define a cluster having a master device in communication with at least one slave device. Each of the master device and the at least one slave device have a corresponding Media Access Control ("MAC") address. A power-on command is sequentially transmitted to each of the at least one slave devices. A different node address is assigned to each of the at least one slave devices. An association of the MAC address of the master device to the node address and MAC address of each of the at least one slave devices is received to form a cluster configuration. In one embodiment, the devices are people counting sensors.

The cluster configuration is stored. The cluster configuration is replicated to the at least one slave device.

In accordance with still another aspect, the present invention provides a computer program product stored in a tangible computer storage device which, when executed by a processor, performs a method of configuring a plurality of people counting sensor devices. The plurality of people counting sensor devices define a cluster having a master device in communication with at least one slave device. Each of the master device and the at least one slave device have a corresponding Media Access Control ("MAC") address. A power-on command is sequentially transmitted to each of the at least one slave devices. A different node address is assigned to each of the at least one slave devices. An association of the MAC address of the master device to the node address and MAC address of each of the at least one slave devices is received to form a cluster configuration. The cluster configuration is stored. The cluster configuration is replicated to the at least one slave device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
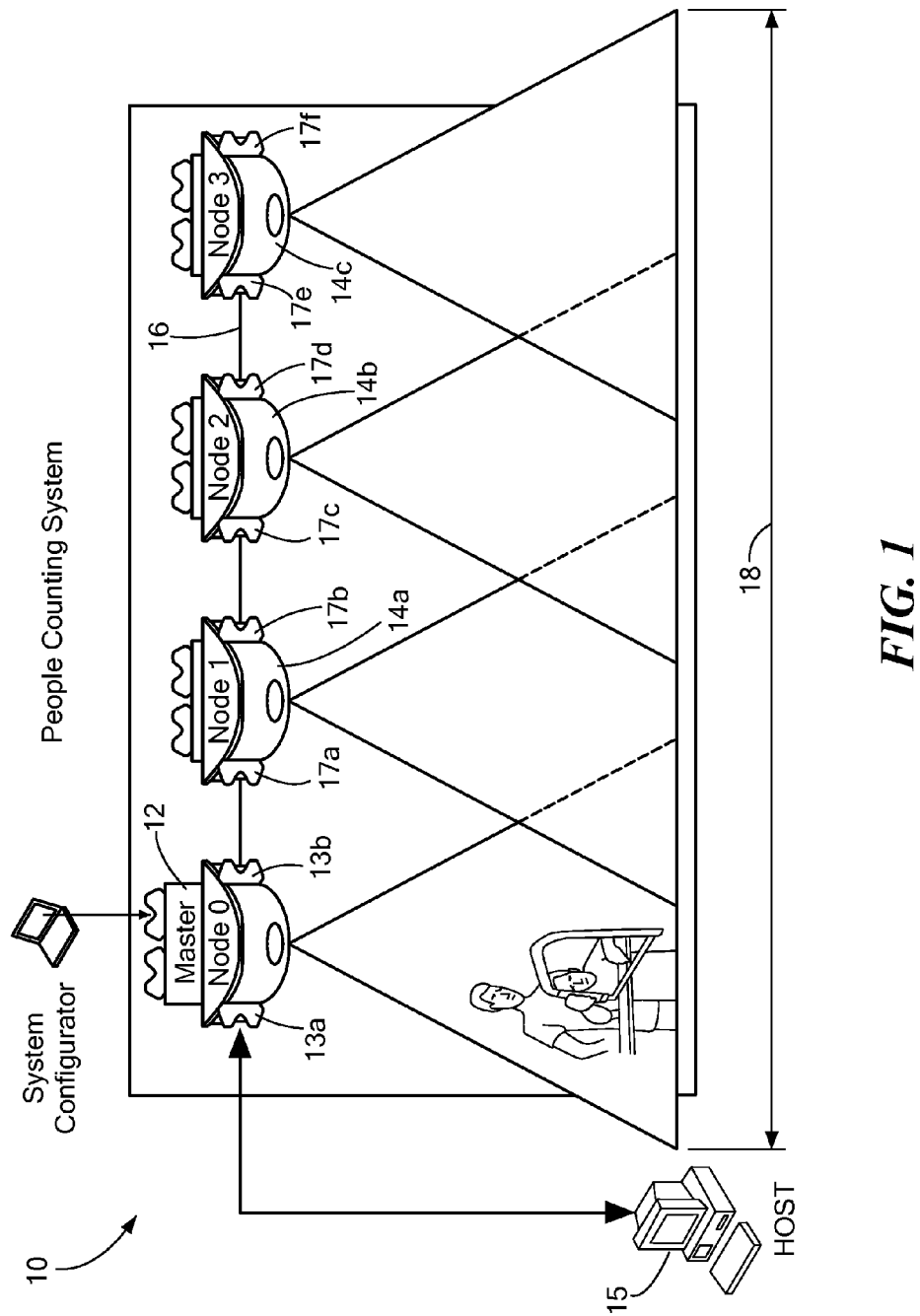
FIG. 1 is a block diagram of an exemplary automated master/slave configuration system constructed in accordance with the principles of the present invention.

Before describing in detail exemplary embodiments that are in accordance with the present invention, it is noted that the embodiments reside primarily in combinations of apparatus components and processing steps related to implementing a system and method for automatically configuring master and/or slave devices in a people counting system.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for automatically addressing and configuring Ethernet-enabled inter-connected devices, wherein a host (master) device is resident on a Dynamic Host Configuration Protocol ("DHCP") link and one or more slave devices are in communication with the master device and with other slave nodes thus forming a cluster of sensor devices for use in a people counting system.

The present disclosure will be understood more fully from the detailed description given below and from the accompanying drawings of particular embodiments of the invention which, however, should not be taken to limit the invention to a specific embodiment but are for explanatory purposes.

Numerous specific details may be set forth herein to provide a thorough understanding of a number of possible embodiments of a system of automatically configuring master and/or slave nodes in a people counting system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments. Also, although the embodiments of the invention are described with reference to a people counting system and sensor devices for people counting, the invention is not limited to such. It is contemplated that the invention can be embodied and implemented using other security system devices, such as electronic article surveillance ("EAS") system components, e.g., pedestals, radio frequency ID ("RFID") system components, i.e., RFID readers, etc. While it is understood that people counting systems may not be considered security system devices, for ease of describing the embodiments herein, people counting systems will be generally referred to within the context of security system components.

Referring now to the drawing figures in which like reference designators refer to like elements, there is shown in FIG. 1 an exemplary configuration of a people counting system 10 constructed in accordance with the principles of the present invention. System 10 includes a plurality of sensing devices include one sensing device designated as a master sensor or master node 12 and one or more slave nodes 14a, 14b and 14c (collectively "14") forming a cluster.

Master node 12 has two ports 13a and 13b, where port 13a is a public port enabling master node 12 to receive communications from host 15 via a public network and port 13b is a private port enabling master node 12 to communicate with slave nodes 14 over an Ethernet connection 16. Each slave node 14 includes a first Ethernet port 17a and a second Ethernet port 17b. Ethernet ports 17a and 17b are private ports allowing communication with other slave nodes 14 and with master node 12 over Ethernet 16. Combined, master node 12 and slave nodes 14 form a detection region in a people counting system. For example, in one embodiment, each node (both master and slave) has an 8' coverage area. Combined, master node 12 and slave nodes 14 combine to cover a 32' space. Of course, the number of nodes and area of space covered by each node can vary and the present invention is not limited in this matter. It should be noted that although the present invention is described using an Ethernet connection between slave nodes 14, the invention is not limited to such. Other network protocols and technologies can be used.

Each slave node 14 links to its master node 12 via Ethernet connection 16 and passes its respective spatial coordinates to master node 12 so as to form one virtually contiguous area of coverage 18 thus accounting for the overlap between sensors and eliminating multiple counts that may occur when objects appear within the overlap field of adjacent sensors. Ethernet connection 16 uses data packets in the form of an Ethernet frame to transmit information from a source to one or more destinations. In one embodiment, a frame begins with Preamble and Start Frame Delimiter, which is followed by an Ethernet header featuring destination and source Media Access Control ("MAC") addresses. The header indicates the MAC addresses of the network devices where a frame originated and where it is ultimately destined, respectively. The middle section of the frame is payload data including any headers for other protocols (e.g. Internet Protocol) carried in the frame. The frame ends with a 32-bit cyclic redundancy check which is used to detect any corruption of data in transit.

In one embodiment, master node 12 obtains its own IP address from host 15, which is a Dynamic Host Configuration Protocol ("DHCP") server and uses this IP address to communicate over the public domain network, e.g., the Internet. DHCP servers use an auto configuration protocol used on IP networks. Devices that are connected to IP networks must be configured before they can communicate with devices on the network. DHCP allows a device to be configured automatically, eliminating the need for intervention by a network administrator. It also provides a central database for keeping track of computers that have been connected to the network. This prevents two computers from accidentally being configured with the same IP address.

Master node 12 runs a DHCP sub-net to assign local addresses to slave nodes 14 within its cluster. The addresses can be, but are not limited to, private IP addresses. Master node 12 then links its MAC address to the MAC address and the assigned local address of slave nodes 14 within its cluster. A MAC address is the unique hexadecimal serial number assigned to each Ethernet network device to identify it on the network. With Ethernet devices, this address is permanently set at the time of manufacture. Each network device has a unique MAC address, so that it will be able to receive only the frames that were sent to it. If MAC addresses were not unique, there would be no way to distinguish between two stations. Devices on a network monitor network traffic and search for their own MAC address in each frame to determine whether they should decode it or not. Special circumstances exist for broadcasting to every device on the network. Thus, only one public IP address is assigned for each cluster, e.g., to master node 12, while a transparent Ethernet communication is maintained across the entire cluster.

Thus, master node 12 replicates the cluster configuration it learns during initial set-up and configuration across all devices within its cluster. By sequentially powering up slave devices 14 and by assigning local addresses, master node 12 has awareness of the logical locations and physical interrelationship of slave devices 14 within its cluster. When a node 12 or 14 in the field needs to be replaced, the user need only replace the defective unit with another one and, at power up, the cluster self configures automatically. This facilitates field installation and upgrades.

Figure 2:
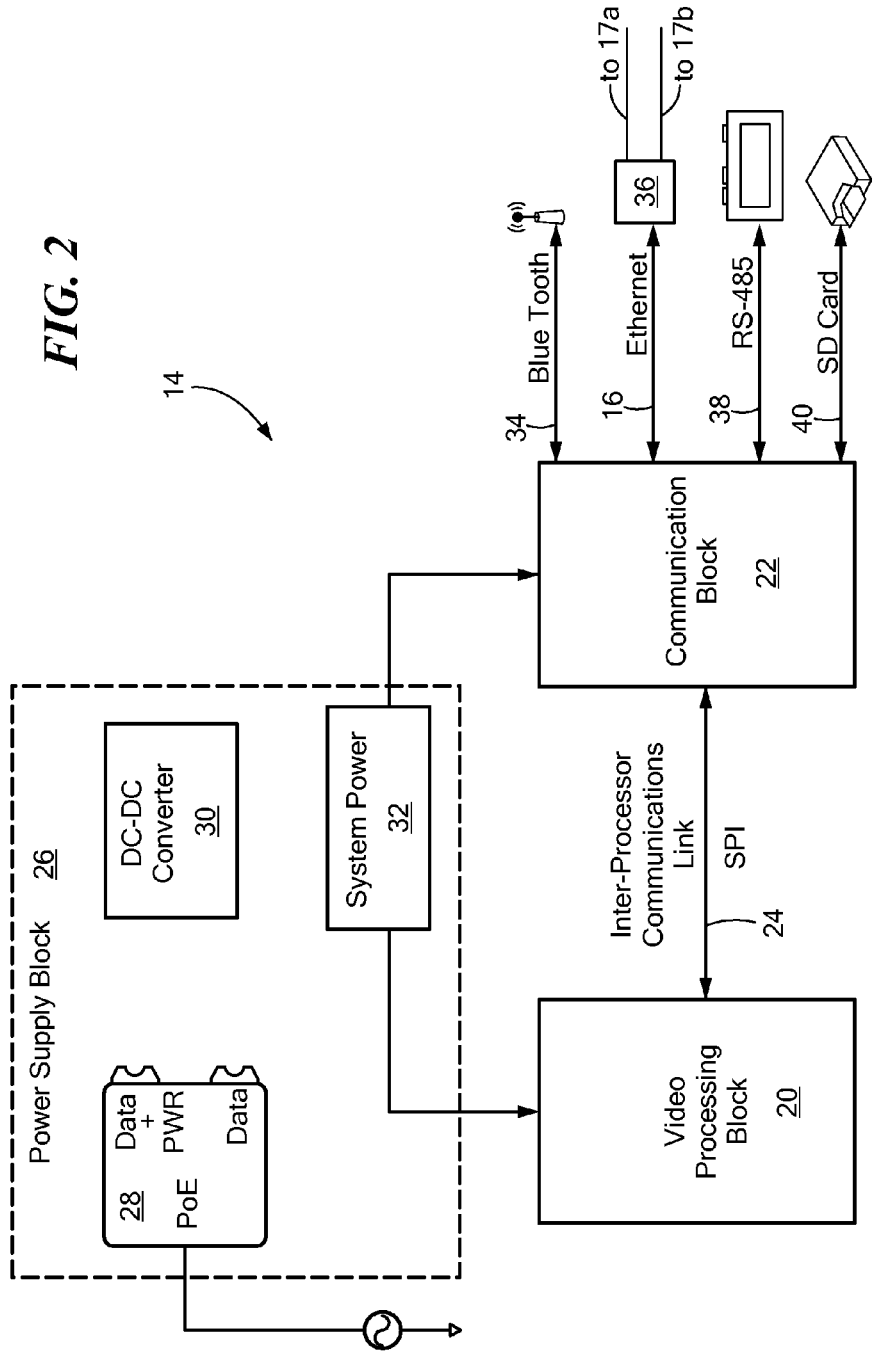
FIG. 2 is a block diagram of an exemplary sensor node used with the automatic master/slave configuration system of the present invention.

FIG. 2 is a block diagram showing the components of an exemplary sensor device, which can be master node 12 or slave node 14. For ease of reference, the sensor device shown in FIG. 2 shall represent slave node 14. Slave node 14 includes a sensing or video processing block 20 in communication with a communications block 22 via a Serial Peripheral Interface ("SPI") line 24. A power supply block 26 provides power to slave node 14. Power supply block 26 includes a Power over Ethernet ("PoE") module 28 in communication with a converter 30. Converter 30 is in communication with a system power unit 32, which provides power to video processing block 20 and communications block 22. Each node need not be powered using PoE but may also receive power via other means. Communication block 22 can communicate with other devices including, for example, a Bluetooth interface 34, a serial interface such as an RS-485 line 38 and a Secure Digital ("SD") card interface 40. Communication block 22 also exchanges signals with an Ethernet controller 36 via Ethernet connection 16. Ethernet controller 36 provides control signals to both of its ports (e.g., ports 17a and 17a) of slave node, e.g., 14a, in the cluster.

Figure 3:
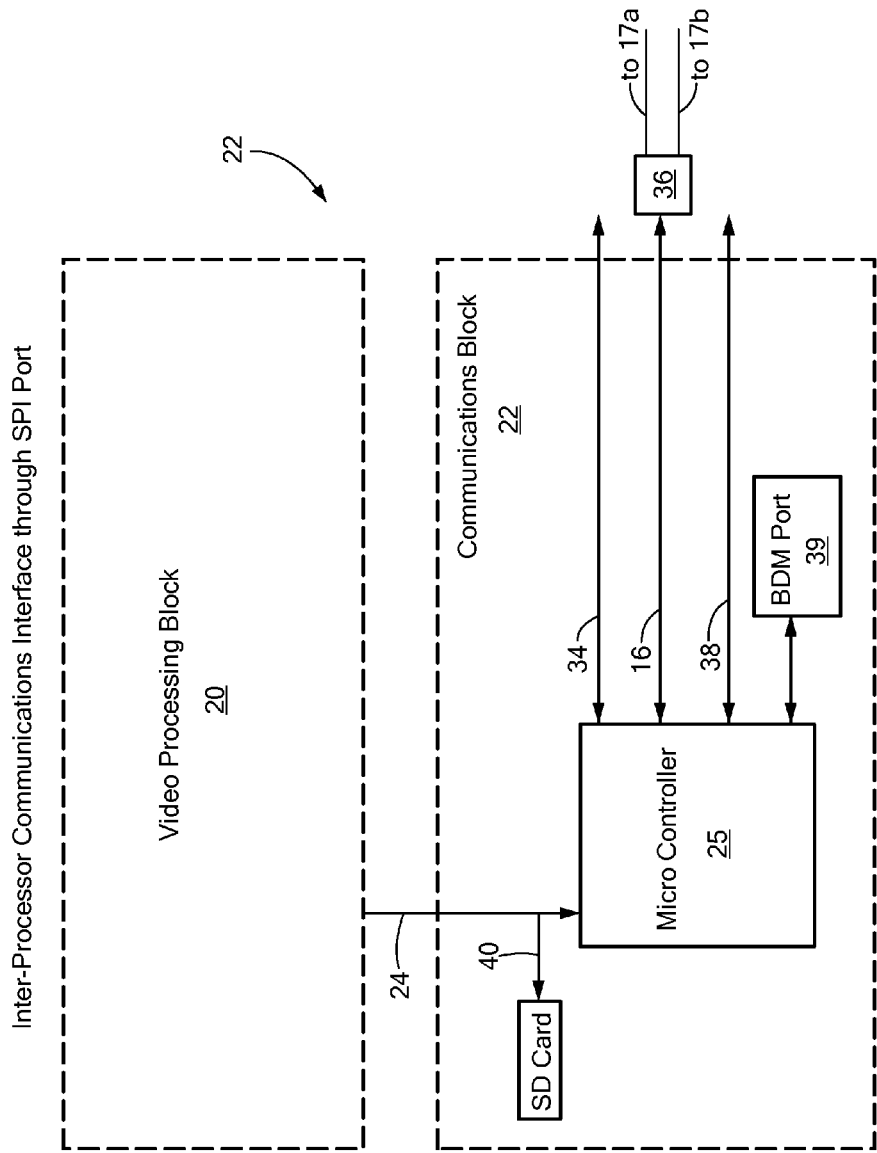
FIG. 3 is a block diagram of exemplary video processing and communications blocks of the sensor node of FIG. 2.

FIG. 3 illustrates the components of communications block 22. Video processing block 20 is connected to microcontroller 25 of communications block 22 over an SPI line 24. Video processing block 20 includes the hardware, software, memory and interface components necessary to capture and process movement of people within the detection range of system 10 and communicate signals representing these movements to communications block 22. Microcontroller 25 of communications block 20 can communicate with other devices via a Bluetooth connection 34, a serial connection such as an RS-485 line 38, an Ethernet connection 16, and to a background debug mode ("BDM") port 39. Microcontroller 25 includes memory to store the configuration tables and programmatic code used to perform the functions of the sensor device nodes 12 and 14 described herein.

Figure 4:
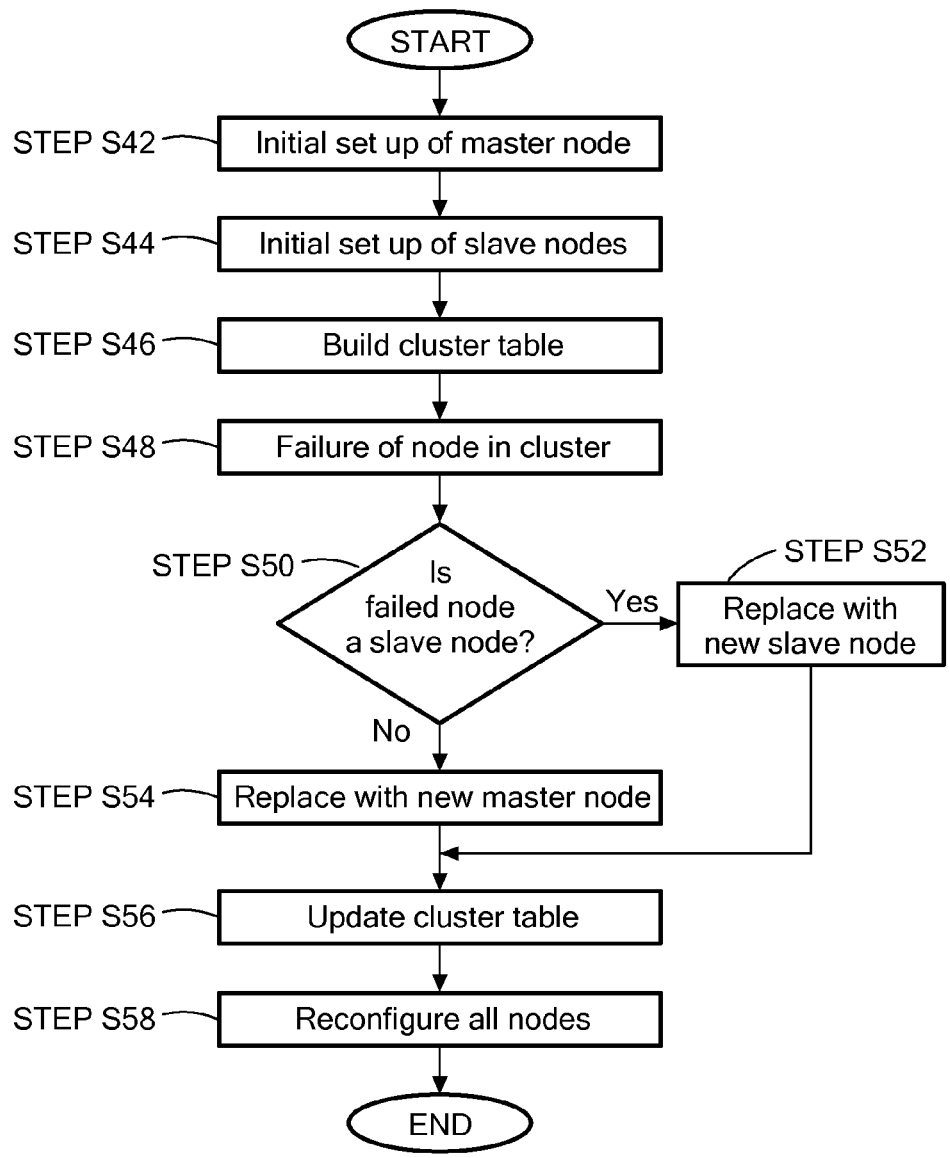
FIG. 4 is a flowchart showing exemplary steps performed by the automatic master/slave configuration system of FIG. 1.

FIG. 4 is a high level flowchart of an exemplary method of performing the present invention. Initially, master node 12 is powered up and initialized (step S42). Similarly, each slave node 14 in the cluster is powered up and initialized (step S44). The powering up and initializing of each slave node 14 in the cluster is performed one slave node at a time, in sequential order. This sequential ordering and initializing is discussed in greater detail below. Once each node in the cluster is powered and initialized, master node 12 determines the identity of the other slave nodes 14 in the cluster and builds a cluster configuration table (step S46). As such, the first entry in the cluster configuration table can be the configuration information of the master node 12. The cluster configuration table is stored in the memory of master node 12 and its contents passed on to each slave node 14 in the cluster. Thus, all slave nodes 14 are aware of the identity and configuration of the other slave nodes 14 in the cluster. When a failure of one of the nodes in the cluster occurs (step S48), it must be determined if the failed node is a master node 12 or a slave node 14 (step S50). If it is determined that the failed node in the cluster is a slave node 14 then the failed slave node 14 is replaced with a new slave node (step S52). On the other hand, if the failed node is determined to be a master node 12 then a new master node replaces the failed master node (step S54). Once the new node has replaced the failed node in the cluster, the cluster configuration table is updated (step S56) to reflect the inclusion of the new node or nodes in the cluster and the each node in the cluster is reconfigured, i.e., the revised cluster configuration table is sent along to each node in the cluster (step S58).

Figure 5:
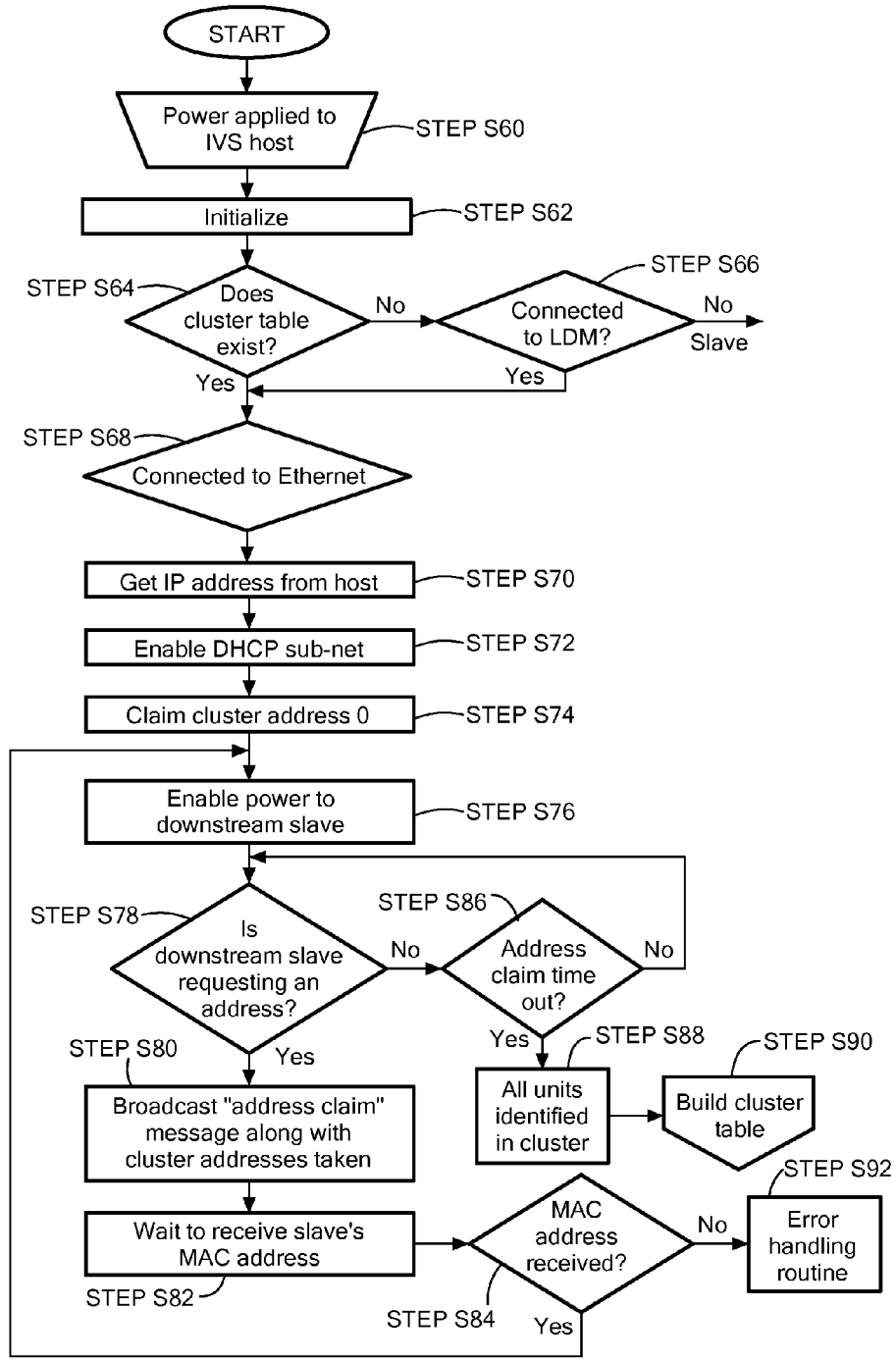
FIG. 5 is a flowchart showing an exemplary method for initializing the master node of the automatic master/slave configuration system of FIG. 1.

FIG. 5 shows an exemplary method performed by the present invention to power up and initialize master node 12 and to enable, power up and configure each slave node 14 in the cluster. Initially, power is applied to the Intelligent Vision System ("IVS") (step S60). Master node 12 receives power from an external power source at its public port 13a. Master node 12 then powers its private port 13b, which provides Power-over-Ethernet ("PoE") to the first port 17a of slave node 14a. Master node 12 is initialized (step S62) and it is determined if master node 12 includes a cluster configuration table (step S64). A cluster configuration table is a data table stored in the memory of master node 12 and includes configuration variables for each slave node 14 in a given cluster. Configuration variables may include the physical and logical addresses for each slave node 14 in the cluster, their spatial coordinates, the virtual count line definitions, and other parameters. If it is determined that master node 12 does not have a cluster configuration table (step S64) and there is no peer-to-peer connection such as a Local Device Manager ("LDM") (step S66), then master node 12 determines that there is no slave node 14 connected to it. Otherwise, if a cluster configuration table exists, it is determined whether master node 12 is connected at private port 13*b* to the Ethernet (step S68). Master node 12 has two ports, public port 13*a* and private port 13*b*. Master node 12 requests and is assigned an IP address from DHCP server 15 via its public port 13*a* (step S70). Master node enables and runs a DHCIP sub-net (step S72) and initializes the first slave node 14*a* in the cluster by assigning this slave node a sub-net address (step S74). Master node 12 then enables power to slave node 14*a* (step S76) by powering up port 13*b* to cause port 17*a* to receive power to energize and power up node 14*a*.

Master node 12 now builds its cluster configuration table by determining if one of the downstream slave nodes 14 is requesting an address (step S78) and broadcasting a message to all slave nodes 14 that each slave node 14 is to accept an assigned address (step S80). Master node 12 receives each slave node's MAC address and continues the port 17 powering process until there are no more slave node address requests (steps S76 to S84). If no more slave node address requests are received and a certain designated time period elapses (step S86) then master node 12 knows it has identified all slave nodes 14 in the cluster (step S88) and finishes building the cluster configuration table (step S90). At this point, the cluster configuration table identifies the nodes 12 and 14 in the cluster, but does not include specific node configuration parameters, e.g., virtual count line definitions. If master node 12 does not receive a MAC address from one of the slave nodes in the cluster, it initializes an error handling routine (step S92). Thus, the first slave node 14*a* of the cluster is powered by a power signal sent from master node 12 to the upstream port 17*a* of slave node 141. Master node 12 then instructs slave node 14*a* to power up its downstream port 17*b*. The upstream port 17*c* of the next slave node 14*b* in the cluster is then powered up by the downstream port 17*b* of slave node 14*a*. This process continues until all slave nodes 14*a* in the cluster are powered up.

Figure 6:
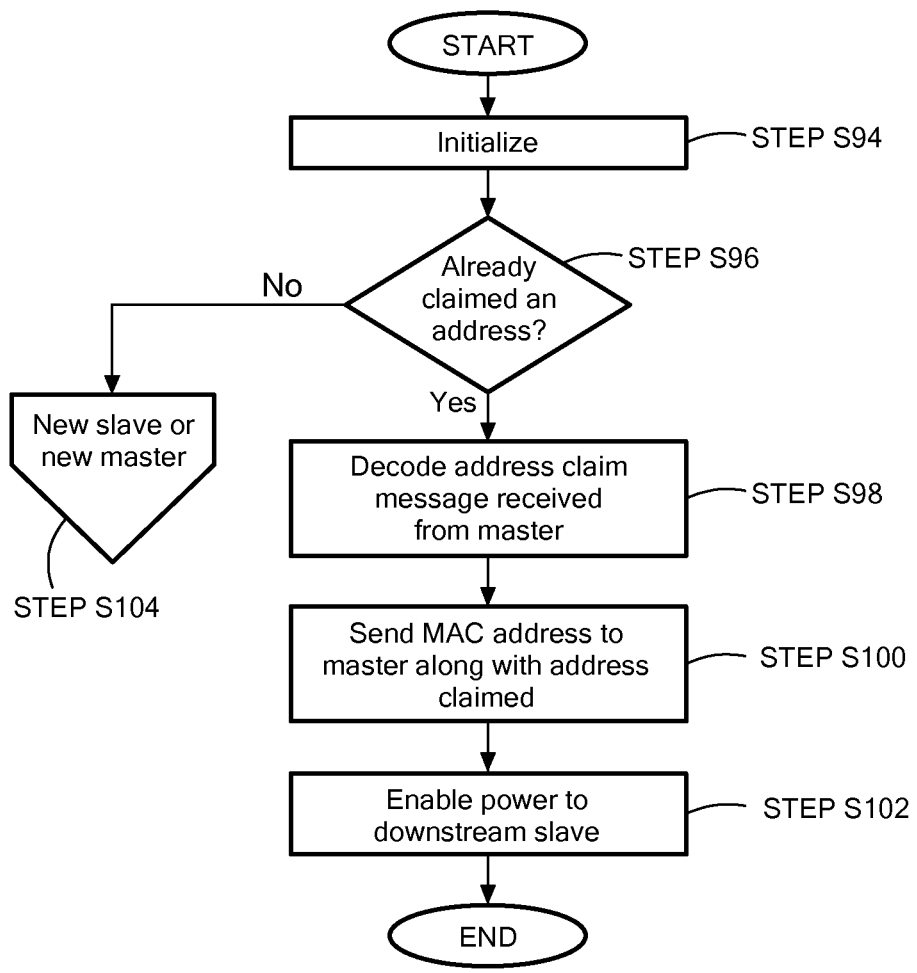
FIG. 6 is a flowchart showing an exemplary method for initializing a slave node of the automatic master/slave configuration system of FIG. 1.

FIG. 6 illustrates the power-up and initialization process for each slave node 14. The first slave node 14*a* in the cluster is powered up and initialized. After its own initialization, slave node 14*a* initializes the next downstream slave node, e.g., slave node 14*b* within the cluster (step S94). If the initialized slave node 14 has already claimed an address (step S96) it decodes the address claim message received from master node 12 (step S98), sends its own MAC address to master node 12 along with the claimed address (step S100) and enables the next downstream slave node 14 in the cluster (step S102). If the initialized slave node 14 has not already claimed an address, it is designated as a new slave node 14 or master node 12 (step S104). This process is repeated such that each slave node 14 in the cluster enables power to the next downstream slave node 14 within the cluster and until all slave nodes 14 have been assigned their unique address as well as linking their MAC address to the master's MAC address within the cluster.

After the initial handshaking between the sensor devices 12 and 14 within the cluster, the configuration parameters for the devices 12 and 14 are set. This may include parameters such as time-synchronization, virtual count lines, calibration, etc. Using a PC or other general purpose computing device, the entire cluster is configured via master node 12 within that cluster. After all parameters have been set up, master node 12 saves these configuration parameters in its cluster configuration table in its configuration memory and replicates the cluster configuration table across all slaves within the cluster.

Thus, in FIGS. 5 and 6 above, system 10 initializes the master node 12 and slave nodes 14 for a given cluster of sensor devices in a people counting system. Master node 12 is powered up, receives an IP address and then determines the identity of the other slave nodes 14 in the cluster. The present invention is not limited to a single cluster people counting system but may utilize the principles of the present invention for multi-cluster systems. After master node 12 determines the identity and configuration of each slave node 14 in the cluster, including receiving MAC addresses and node configuration parameters from each slave node 14, master node 12 builds the cluster configuration table listing each slave node 14, their addresses and configuration parameters, and replicates the cluster configuration table, including the master node's own address, among each slave node 14 in the cluster. Each node therefore is aware of the identity and configuration of all other nodes in the cluster. Each slave node's local address as well as its MAC address is logically linked to the MAC address of master node 12. Because MAC addresses are unique to each device, no two Ethernet-based nodes will have the same MAC address.

In this fashion, since the node addresses and configuration parameters of the entire cluster is set up just once during installation, in the event of a failure, the failed node can be replaced and the network restored to normal operation without manual intervention and expensive time-consuming re-configuration. Further, the present invention allows a cluster of nodes to be logically addressed and mapped to a physical address in an orderly fashion so that master node 12 can determine the logical order of its associated slave nodes 14, thus enabling master node 12 to build a map of the sequential order of slave nodes 14 within its cluster.

Figure 7:
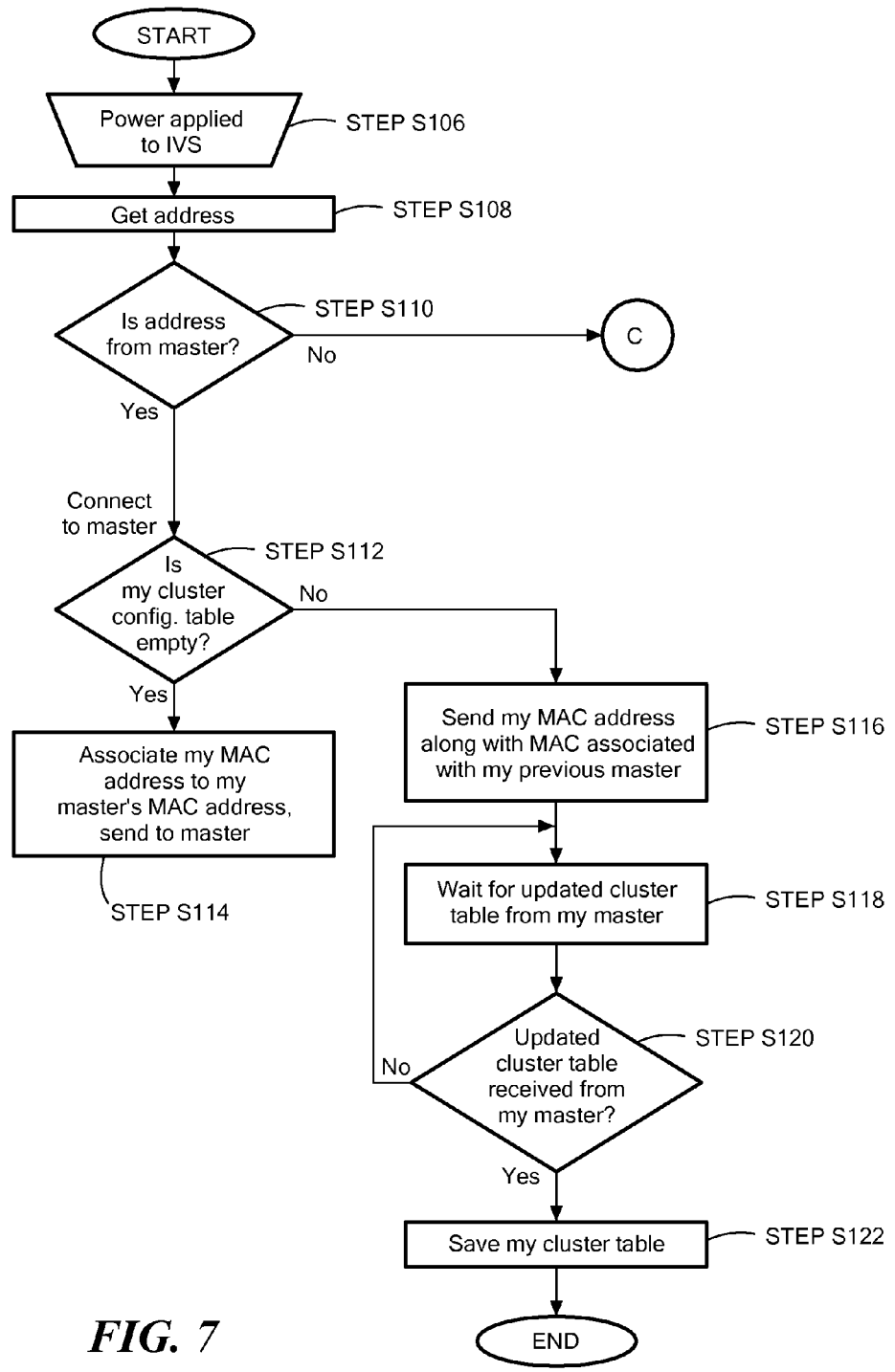
FIG. 7 is a flowchart showing an exemplary auto-addressability and auto-configurability process for a slave node accordance with the principles of the present invention.
Figure 8:
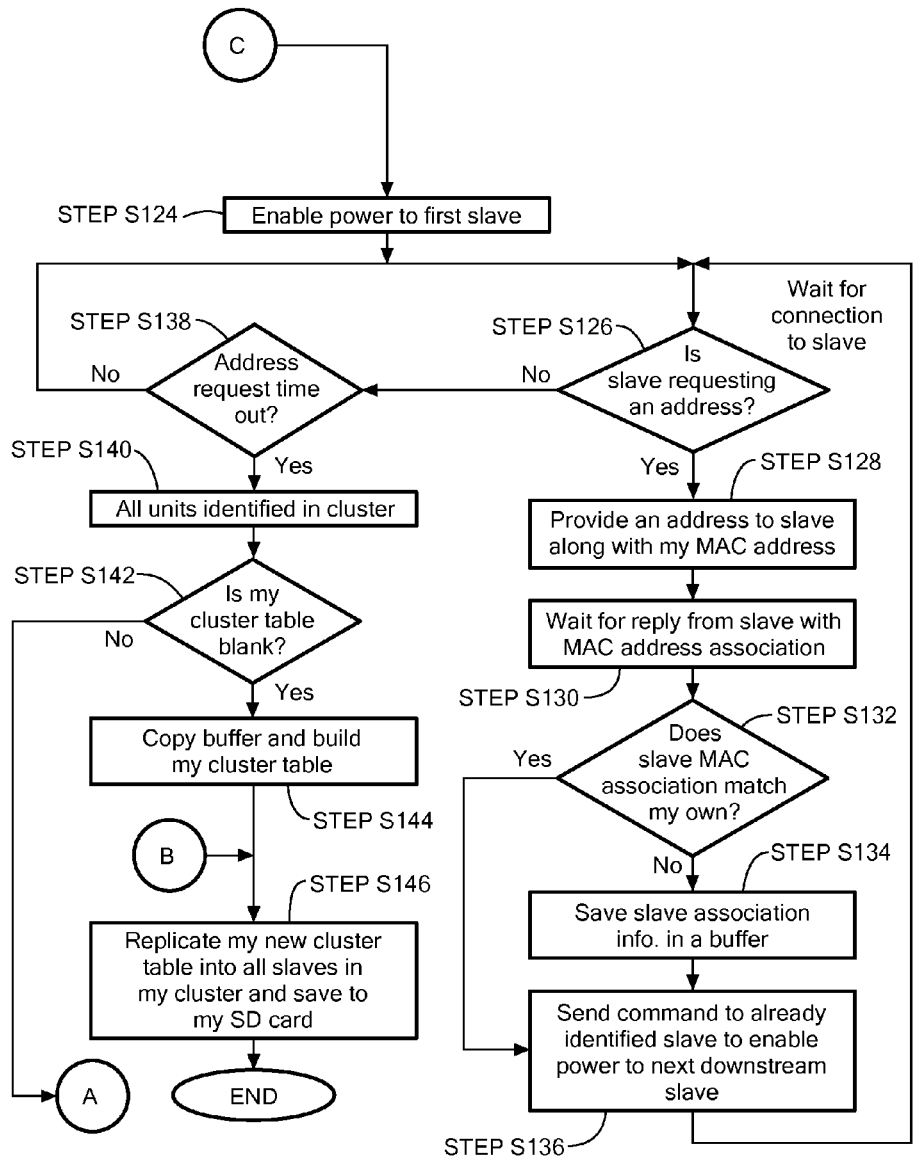
FIG. 8 is a flowchart showing an exemplary auto-addressability and auto-configurability process for a master node accordance with the principles of the present invention.
Figure 9:
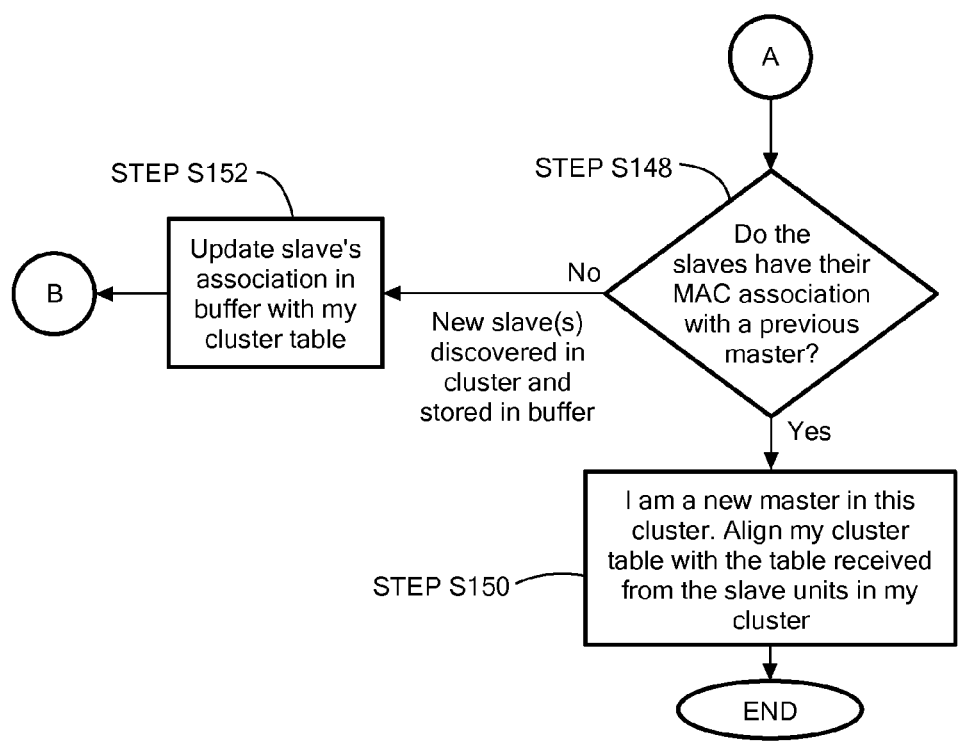
FIG. 9 is a continuation of the flowchart of FIG. 8, showing an exemplary auto-addressability and auto-configurability process for a master node accordance with the principles of the present invention.

Unlike prior art systems in which a failed device, and in some cases the entire network, requires its configuration parameters downloaded again, a failed device using the present invention needs simply to be replaced and then re-powered. The system at power-up then reconfigures itself without any further manual intervention. FIGS. 7-9 describe processes where a master or slave node within an already-configured multi-node cluster, has failed and describe an exemplary automatic re-configuration feature of the present invention.

It is assumed that the system has been powered down and the failed node replaced with a new node. The system is then powered up. Referring now to FIGS. 1 and 7, after power is supplied to master node 12 (step S106), the new node in the cluster is assigned an address (step S108). The new node receiving the address must determine if it is a master node 12 or one of the slave nodes 14 in the cluster. To accomplish this, the new node determines if the address it was assigned came from a device, i.e., an assigning device, that is a master node 12 (step S110) such as by looking in the cluster configuration table to determine if its MAC address is associated with master node 12. If the address came from master node 12 then the node identifies itself as a slave node 14. If the address did not come from master node 12, then the node receiving the address knows that it is a master node 12. The flowchart of FIG. 8, beginning at connector "C", illustrates this scenario and is discussed below.

Referring again to FIG. 7, new slave node 14, knowing that it is a slave node, establishes communication with master node 12. New slave node 14 determines if its cluster configuration table is empty (step S112). If its cluster configuration table is empty, the new slave node 14 associates its MAC address to the MAC address of its master node 12 (step S114). If the new slave node 14 already has a cluster configuration table, then new slave node 14 sends its MAC address along with the MAC address of its previous master node 12 to master node 12 (step S116). New slave node 14 waits until master node 12 has updated its own cluster configuration table with the configuration and address parameters of new slave node 14 and has sent new slave node 14 an updated cluster configuration table (step S118). Slave node 14 waits until it has received the updated cluster configuration table from master node 12 (step S120) and when received, saves the updated cluster configuration table and its contents in its memory (step S122). This arrangement allows automated configuration of a new slave node since the new slave node automatically updates its MAC association and receives a new cluster configuration table from master node 12 that includes the configuration parameters the new slave node 14 needs to configure itself for operation.

FIG. 8 is a flowchart of the process in which, after power is supplied to the IVS, e.g., host 15, the newly replaced node in the cluster is assigned an IP address and determines that the newly assigned address is not from a master node but is an IP address from the DHCP server 15. In this fashion, the new node determines it is a new master node 12. At power up, the new master node 12 scans its own cluster configuration table to determine if one in fact exists. When a failed master node 12 is replaced with a new master node 12, its cluster configuration table is empty. One method of "emptying" the cluster table is to "read" a switch upon power up. If the switch is held for a predetermined period of time, a processor erases the contents of the cluster configuration table. Master node 12 then enables power to the first slave node 14*a* in the cluster (step S124). Once the new master node 12 is connected to the first slave node 14*a* within the cluster it "listens" for the slave node 14*a* to request an address (step S126). If no address is requested, master node 12 provides an address to slave node 14*a* (step S128) and waits for a reply from slave node 14*a* with a MAC address association (step S130).

Upon receipt of the MAC address association from slave node 14*a*, new master node 12 determines if the MAC address association that it receives from slave node 14*a* matches its own (step S132). If it does not match, the association is saved into a buffer (step S134). A command is then sent to the identified slave node 14*a* to enable the next downstream slave node 14*b* in the cluster (step S136). This process continues until master node 12 no longer receives address requests from slave nodes 14 in the cluster. Thus, after a predetermined amount of time has passed (step S138), time master node 12 knows that each slave node 14 in the cluster has been enabled and identified (step S140). At this time, new master node 12 has obtained the MAC addresses and configuration parameters from each slave node 14 in the cluster. It then determines if its own cluster configuration table is blank (step S142). If its own cluster configuration table is blank, master node 12 copies the address associations stored in the buffer (as per step S132) and builds a new cluster table (step S144). This new cluster configuration table is copied to all slave nodes 14 in the cluster and the table stored in the SD card of master node 12 (step S146).

FIG. 9 illustrates the steps taken by the present invention if master node 12 determines that its cluster configuration table is not empty (as per step S142 of FIG. 8). If the master node 12 determines its cluster configuration table is not empty, master node 12 polls other slave nodes 14 in the cluster and receives MAC associations in order to determine if any slave nodes 14 have certain parameters such as their previous master's MAC associations and configuration parameters (step S148). This indicates that these slave nodes 14 are not new but existing nodes that already had a relationship with a prior master node 12. If this is the case, master node 12 identifies itself as the new master node 12 in the cluster and proceeds to copy the slaves nodes' 14 configuration into its own cluster configuration table, links its own MAC address to its corresponding slave nodes 14 and replicates that address and configuration data across to all slave nodes 14 (step S150). If one or more slave nodes 14 do not have MAC address associations with an earlier master node 12, then master node 12 determines that there are one or more new slave nodes 14 in the cluster and updates its own cluster configuration table by using the MAC association for the new slave node 14 that is stored in the buffer of master node 12 (step S152).

In certain instances, master node 12 may determine that the number of slave nodes 14 in the cluster does not match the number of slave nodes 14 stored in its cluster configuration table. If this occurs, master node 12 will flag an error and indicate this status on its LED display. If for any reason master node 12 can't "find" its slave nodes and it determines that its own cluster configuration table is not empty, master node 12 will flag an error on its status LED indicating that it needs to be configured. If the master cluster configuration table is not empty, and it determines after a certain time out period that no slave nodes 14 exist within its cluster, master node 12 will establish itself as a single sensor system, i.e., a people counting system having only a single, master sensing device.

The present invention provides a method and system to automatically configure a new sensor node that replaces a failed sensor node in a people counting system 10. System 10 includes a master node 12 and one or more sensor nodes 14, which form a cluster. System 10 may include only a single cluster or may include several clusters. Initially, master node 12 and slave nodes 14 need to be powered up and initialized. Public node 13*a* of master node 12 receives power from an external power source. Master node 12 is assigned an IP address from a DHCP server. At this time, no other slave nodes 14 in the cluster are powered up. Master node 12 then powers its private port 13*b*, which provides power over Ethernet to the first port 17*a* of the first slave node 14*a* in the cluster. Master node 12 assigns this first slave node 14*a* an address, which could be any address including a TCP/IP address. Master node 12 stores the address and configuration parameters of slave node 14*a* and commands slave node 14*a* to power up its second port 17*b*. Slave node 14*a* then sends out an inquiry to the next slave node in the cluster, e.g., slave node 14*b*, asking slave node 14*b* to identify itself. The identity of slave node 14*b* is revealed, and the process repeated. When master node 12 fails to receive any further address and configuration information it knows it has all the information necessary to store the slave node information in a cluster table.

When a node within system 10 fails, it must be replaced. It is first determined if the node that failed is a master node 12 or a slave node 14. If a slave node has failed, a new slave node 14 is inserted into the cluster and replaces the failed slave node 14. System 10 re-boots and master node 12 recognizes a new MAC address for new slave node 14. Master node 12 sends configuration information to new slave node 14, updates its own cluster configuration table to include the address and configuration parameters of the new slave node 14 and "pushes" the new cluster configuration table out to all slave nodes 14 in the cluster. If it is determined that the failed node in the cluster was master node 12, a new master node 12 replaces the failed master node 12, and the new master node 12 asks each slave node 14 in the cluster to identify itself.

When the new master node 12 receives this information it recognizes itself as a new master node 12. It accomplishes this by receiving information from each slave node 14 in the cluster. If the configuration of two or more slave nodes 14, which includes the previous MAC address of the failed master node 12, match each other and is different from the current configuration of master node 12, then the current device assumes it is a new master node 12. In this fashion, the new node knows it is a new master node 12 because it does not recognize the address of the failed master node 12. Once master node 12 realizes it is the new master node in the cluster it asks each slave node 14 to send it their addresses and configuration parameters. New Master node 12 then builds a new cluster configuration table and pushes the information in the table out to all slave nodes 14 in the cluster. Thus, regardless whether the failed node is a master node or a slave node, system 10 provides an efficient method of recognizing the failed node, and after replacement with a new node and re-booting of the system 10, automatically reconfigures each node in the cluster.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The present invention can be implemented in hardware and embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A sensor system, comprising:
a plurality of addressable devices, the plurality of addressable devices defining a sensor cluster comprising a first master sensor device in communication with at least one slave sensor device, the first master sensor device configured to:
sequentially transmit power-on commands to each of the at least one slave sensor device to identify the at least one slave sensor device for cluster configuration;
build a cluster configuration table, the cluster configuration table assigning a different node address to each of the at least one slave sensor devices;
determine at least one device configuration for the at least one slave sensor device listed in the cluster configuration table, the at least one device configuration including:
spatial coordinates of the at least one slave sensor device; and
virtual count lines of the at least one slave sensor device, the virtual count lines corresponding to cross-over thresholds for accounting for overlap between respective sensors;
update the cluster configuration table to include the determined at least one device configuration;
store the updated cluster configuration table; and
replicate the updated cluster configuration table to the at least one slave sensor device.

2. The system of claim 1, further comprising a dynamic host configuration protocol (DHCP) server, the DHCP server assigning a public IP address to the first master sensor device.

3. The system of claim 2, further comprising a plurality of clusters, each cluster including a master sensor device and at least one slave sensor device, each of the master sensor devices in the plurality of clusters receiving a public IP address from the DHCP server.

4. The system of claim 2, the first master device further comprising a public port for receiving the public IP address from the DHCP server and a private port for communicating with the at least one slave sensor device.

5. The system of claim 1, wherein each slave sensor device comprises two Ethernet ports for communicating with other addressable devices over corresponding Ethernet connections.

6. The system of claim 5, wherein one of the two Ethernet ports is an upstream port and the other of the two Ethernet ports is a downstream port, the upstream port of a first slave sensor node in the cluster powered by the first master sensor device, the powered downstream port of the first slave sensor node in the cluster powering the upstream port of the next slave sensor node in the cluster.

7. The system of claim 1, wherein the at least one slave sensor device is configured in an ordered sequence with respect to the first master sensor device;
the sequential transmission of power-on commands configured to power on and initialize each slave sensor device in the ordered sequence;
the updating of the cluster configuration table occurring iteratively by adding the at least one device configuration to the configuration table after the initialization of each slave sensor device.

8. The system of claim 1, wherein the addressable devices are people counting sensors.

9. A method of configuring a plurality of sensor devices, the plurality of sensor devices defining a cluster comprising a master sensor device in communication with at least one slave sensor device, the method comprising:
sequentially transmitting a power-on command to each of the at least one slave sensor devices to identify the at least one slave sensor device for cluster configuration;
building a cluster configuration table, the cluster configuration table assigning a different node address to each of the at least one slave sensor devices;
determining at least one device configuration for the at least one slave sensor device listed in the cluster configuration table, the at least one device configuration including:
spatial coordinates of the at least one slave sensor device; and virtual count lines of the at least one slave sensor device, the virtual count lines corresponding to cross-over thresholds for accounting for overlap between respective sensors;

updating the cluster configuration table to include the determined at least one device configuration;

storing the updated cluster configuration table; and replicating the updated cluster configuration to the at least one slave sensor device.

10. The method of claim 9, further comprising receiving a public IP address from a dynamic host configuration protocol (DHCP) server.

11. The method of claim 10, the master sensor device including a public port for receiving the IP address from the DHCP server and a private port for communicating with the at least one slave sensor device.

12. The method of claim 9, wherein the plurality of sensor devices are people counting sensor devices.

13. The method of claim 9, wherein each slave sensor device comprises two Ethernet ports for communicating with other addressable people counting sensor devices over corresponding Ethernet connections.

14. The method of claim 13, wherein one of the two Ethernet ports is an upstream port and the other of the two Ethernet ports is a downstream port, further comprising powering the downstream port of a first slave sensor node in the cluster, the powered downstream port of the first slave sensor node in the cluster powering the upstream port of the next slave sensor node in the cluster.

15. The method of claim 9,
wherein the sequential transmission of power-on commands is configured to power on and initialize each slave sensor device in the ordered sequence;
the at least one slave sensor device is configured in an ordered sequence with respect to the master sensor device; and
the updating of the cluster configuration table occurring iteratively by adding the at least one device configuration to the configuration table after the initialization of each slave sensor device.

16. The method of claim 15, wherein a first entry in the cluster configuration table corresponds to the master sensor device.

17. The method of claim 9, further comprising:
determining if one of the plurality of devices has failed based on a change in a Media Access Control ("MAC") address association between the MAC address of the master sensor device and at least one of the slave sensor devices within the cluster;
revising the cluster configuration table to include the changed association; and
replicating the revised cluster configuration table to the at least one slave sensor device.

18. The method of claim 17, further comprising determining whether a failed device is a master sensor device or a slave sensor device based on a quantity of changes in MAC address associations between the MAC address of the master sensor device and at least one of the slave sensor devices within the cluster.

19. The method of claim 18, wherein determining if the failed device is a master sensor device or a slave sensor device comprises:
determining that a new sensor device is a master sensor device if the at least one slave sensor device has corresponding associations with a different master sensor device; and
determining that the new sensor device is a slave sensor device if the slave sensor device association has changed.

20. A computer program product stored in a non-transitory computer storage device which, when executed by a processor, performs a method of configuring a plurality of people counting sensor devices, the plurality of people counting sensor devices defining a cluster comprising a master sensor device in communication with at least one slave sensor device, the method comprising:
sequentially transmitting a power-on command to each of the at least one slave sensor devices to identify the at least one slave sensor device for cluster configuration;
building a cluster configuration table, the cluster configuration table assigning a different node address to each of the at least one slave sensor devices;
determining at least one device configuration for the at least one slave sensor device listed in the cluster configuration table, the at least one device configuration including:
spatial coordinates of the at least one slave sensor device; and
virtual count lines of the at least one slave sensor device, the virtual count lines corresponding to cross-over thresholds for accounting for overlap between respective sensors;
updating the cluster configuration table to include the determined at least one device configuration;
storing the updated cluster configuration table; and
replicating the updated cluster configuration table to the at least one slave sensor device.

21. The system of claim 1, wherein the first master sensor device is replaced with a second master sensor device, the second master sensor device, upon power-up, being configured to:
determine whether the second master sensor device is one of a master sensor node and slave sensor device;
if the determination is made that the second master sensor device is a master sensor node, poll the at least one slave device;
in response to the polling, receive at least one device configuration for the at least one slave sensor device, the at least one device configuration including:
spatial coordinates of the at least one slave sensor device; and
virtual count lines of the at least one slave sensor device, the virtual count lines corresponding to cross-over threshold for accounting for overlap between respective sensors;
update a cluster configuration table based at least in part on the received at least one device configuration;
replicate the cluster configuration table to the at least one slave sensor device.

22. The system of claim 1, wherein the first master sensor device is replaced with a second master sensor device, the second master sensor device, upon power-up, being configured to:
determine whether the second master sensor device is one of a master sensor node and slave sensor device;
if the determination is made that the second master sensor device is a master sensor node, determine at least one device configuration for at least one slave sensor device, the at least one device configuration accounting for overlap between sensors and for multiple people counts that occur if an object appears within the overlap field of adjacent sensor devices;

update a cluster configuration table based at least in part on the at least one device configuration;

replicate the cluster configuration table to the at least one slave sensor device.

23. The system of claim 1, wherein the at least one device configuration accounts for overlap between sensors and for multiple people counts that occur if an object appears within the overlap field of adjacent sensor devices.

* * * * *